United States Patent [19]

Swarts

[11] Patent Number: 6,004,663
[45] Date of Patent: Dec. 21, 1999

[54] SOLID SURFACE MATERIAL WITH FOAM BACKING

[75] Inventor: Donald Eugene Swarts, Grand Island, N.Y.

[73] Assignee: E. I. du Pont de Nemours and Company, Wilmington, Del.

[21] Appl. No.: 08/931,171

[22] Filed: Sep. 16, 1997

Related U.S. Application Data

[63] Continuation of application No. 08/412,794, Mar. 29, 1995, abandoned.

[51] Int. Cl.$^6$ ........................................................ B32B 5/14
[52] U.S. Cl. .................................... 428/310.5; 428/313.5; 428/313.7; 428/313.9; 428/317.9; 428/318.4; 428/323; 428/325; 428/327; 428/212
[58] Field of Search ..................................... 428/212, 217, 428/218, 219, 310.5, 313.3, 313.9, 314.4, 316.6, 317.9, 318.4, 322.7, 323, 325, 327, 332, 313.5, 313.7

[56] References Cited

U.S. PATENT DOCUMENTS

| | | |
|---|---|---|
| 1,978,301 | 10/1934 | Fisher . |
| 3,847,865 | 11/1974 | Duggins . |
| 4,085,246 | 4/1978 | Buser et al. ............................ 428/220 |
| 4,419,459 | 12/1983 | Melchior .................................. 521/59 |
| 4,446,177 | 5/1984 | Munoz et al. ............................. 428/15 |
| 4,876,141 | 10/1989 | Kobayashi et al. ..................... 428/217 |
| 4,921,754 | 5/1990 | Ishihara ................................... 428/325 |
| 5,431,995 | 7/1995 | Narita et al. ............................ 428/287 |
| 5,480,714 | 1/1996 | Ito et al. .................................. 428/324 |
| 5,506,039 | 4/1996 | Kimura et al. .......................... 428/218 |
| 5,662,846 | 9/1997 | Swarts ....................................... 264/69 |
| 5,800,910 | 9/1998 | Harke et al. ............................ 428/212 |

FOREIGN PATENT DOCUMENTS

| | | |
|---|---|---|
| 1310796 | 12/1992 | Canada . |
| 0285046 A2 | 10/1988 | European Pat. Off. . |
| 0526818 A2 | 2/1993 | European Pat. Off. . |
| 1470322 | 8/1967 | France . |
| 31 24 490 A1 | 1/1983 | Germany . |
| 1076167 | 7/1967 | United Kingdom . |
| WO 83/03223 | 9/1983 | WIPO . |
| WO 88/04322 | 6/1988 | WIPO . |
| WO 89/05310 | 6/1989 | WIPO . |

OTHER PUBLICATIONS

Patent Abstracts of Japan, vol. 10, No. 90 9C–337), Apr. 8, 1986 and JP,A60 223848 (Ina Seitou Kk), Nov. 8, 1985.

Patent Abstracts of Japan, vol. 10, No. 191 (M–495), Jul. 4, 1986 and JP,A,61 035915 (Asahi Chem. Ind. Co. Ltd.0, Feb. 20, 1986.

Database WPI, Week 7734, Derwent Publications Ltd., London, GB; AN 77–60215y, XP002010320 and JP,A,52 082 969 9Takamizu Kagaku Kog), Jul. 11, 1977.

Patent Abstracts of Japan, vol. 014, No. 261 (C–725), Jun. 6, 1990 and JP,A,02 074577 (Masao Ose), Mar. 14, 1990.

*Primary Examiner*—Marie Yamnitzky

[57] ABSTRACT

A solid surface material is provided with a thin layer of filled polymer integrally formed with a backing of bubble-filled polymer, without an interface or transition zone in the polymer matrix.

6 Claims, No Drawings

SOLID SURFACE MATERIAL WITH FOAM BACKING

This is a continuation of application Ser. No. 08/412,794 filed Mar. 29, 1995, now abandoned.

BACKGROUND OF THE INVENTION

This invention relates to a composite cast article having a polymeric solid surface with added filler and a backing of similar material also filled with hollow bubbles, with no transition zone of unfilled polymer between the layers.

Solid surface materials are known in the art including those based on polymethyl methacrylate and alumina trihydrate. Basic technology for these products is disclosed in U.S. Pat. Nos. 3,847,865—Duggins (1974), 4,085,246—Buser, Roedel and Vassiliou (1978), and published PCT patent application US88/04322—Frank, Otremba, Pohl and Schlier (1988).

Prior attempts to laminate such solid surface materials with bubble-filled backing material and fiberglass-reinforcement have led to expensive multi-step processes and to laminar products which had distinctly different layers with their own properties. Laminar products generally are more prone to delamination and other weaknesses due to the interface under certain conditions than integral products. Among the multi-layer, laminated products of this type is that of EP 285,046—Schock (1993).

All of the above-mentioned documents are incorporated herein by reference for their teachings of methods and materials for making solid surface filled polymeric materials. It would be desirable to be able to provide lighter weight sheet material with the surface characteristics of this solid surface material in integral form without laminar transitions between layers, and to be able to prepare such products by less expensive processes.

SUMMARY OF THE INVENTION

The present invention provides a cast composite article comprising a polymeric matrix and at least two zones of different filler, said article being essentially flat with two opposing faces, a first zone of such article including one face of the article having a filler at a level in the range 10 to 80% by weight of the filler plus matrix, and a second zone including the second face opposing said first face having filler of 5 to 60% and 3 to 30% of bubbles, both by weight of the filler and bubbles plus matrix, said first and second zones forming a continuum with essentially no layer of unfilled matrix between the two zones. The fillers can be alumina trihydrate, alumina, silica calcium carbonate, ground particles of filled or unfilled resins, glass, and natural stone materials. The bubbles can be glass and polymeric microspheres, fly ash, perlite, and other naturally occurring materials in the form of bubbles. The polymer is prepared from a monomer which can be acrylic acid, methacrylic acid, alkyl acrylates and methacrylates having 1–18 carbon atoms in the alkyl group, styrene, substituted styrenes, vinyl acetate, acrylonitrile, methacrylonitrile, maleic anhydride, esters of maleic acid, itaconic acid and esters of itaconic acid, with or without a crosslinking dimer, trimer, or tetramer. A third zone similar to the first may be included on the opposing side of the second zone. Second, a cast article of claim 1 having an additional layer of hard facing on said first face, such hard facing comprising a matrix of polymer with enough of a hard filler to provide scratch and wear resistance.

In other embodiments, a third layer is added to the second layer, having a composition in the limits of the first layer. Also, a hard face can be added by applying it before the first layer with a filler harder than ATH, such as alumina, silica, calcium carbonate, or natural stone material such as granite. Furthermore, ground particles of filled or unfilled resin can be added to the first layer in accordance with the ground particles taught in U.S. Pat. No. 4,085,246.

DETAILED DESCRIPTION

An advantage of the invention is that it provides a light weight, more economical solid surface material without any transition zone of polymer which could create a zone of brittleness or cause other mechanical difficulties. Such products can be made by one-step or two-step casting processes. Parts, proportions and percentages are by weight except where indicated otherwise.

Example 1

One-Step Casting Procedure

A polymerizable mix is prepared by adding two or more fillers to methyl methacrylate monomer or a blend of this monomer with a syrup of about 20% polymethylmethacrylate dissolved in this monomer. In this example the fillers are 1) aluminum trihydrate, 2) hollow glass bubbles, preferably 3M "Scotchlite" S-22—10–100 µm, median 40 µm, and 3) a beige tinting pigment. The syrup comprises approximately 20% polymethylmethacrylate in monomer. A mixture is made by blending the following ingredients:

|  | Wt % |
|---|---|
| Methyl methacrylate | 50.5 |
| Syrup | 5.5 |
| Alumina trihydrate | 33.0 |
| "Scotchlite" S-22 (10–100 µm median, 40 µm) glass bubbles | 11.0 |
|  | 100.0 |

A small amount of beige pigment (<1.0%) is added to tint the product An initiator is added and the mix is evacuated to remove air. The mixture is then cast into a mold.

The mixture has a low viscosity (about 100 centipoise or 0.1 Psec.) which facilitates the fillers separating into layers according to their specific gravity compared to that of the liquid phase. The hollow glass bubbles (sp.gr. 0.22) will rise in the liquid (sp.gr. about 1.0) while the heavier aluminum trihydrate (sp.gr. 2.42) and beige pigment will settle to the bottom. Vibrating the mix prior to curing will speed up the separation of the fillers in the mixture and disperse the fillers more uniformly in their respective layers. After casting and curing in a 3.8 cm thick mold, there are two separate layers, a 0.8 cm face layer of acrylic polymer containing the alumina trihydrate and tint, and a 3.0 cm back layer containing the glass bubbles and aluminum trihydrate. However, there is no interface between the layers. They are integral, with the polymer matrix continuous throughout the structure. The thickness ratio of the face layer to the foam back layer with this composition was approximately 1:4. There was 73.8% alumina trihydrate in the face layer and 9.7% alumina trihydrate in the foam layer (as measured thermogravimetrically).

Having the heavier filler(s) in both the face and foam layer is desirable due to the property improvements imparted by this filler. Among those are improved strength and stiffness, resistance to impact damage, fire retardancy, color distribution and dimensional stability. The partition of the heavier filler(s) takes place after casting and before any gelling or curing. The amount in each layer is determined and controlled by several process variables, including the level in the original mix composition, mix viscosity, mix temperature and the amount of vibrating after casting. The range of heavier filler in the face layer is from 10 to 80% and in the foam layer from 5 to 60%, with preferred ranges of 30 to 60% for the face layer and 10 to 30% for the foam layer.

Example 2

"Wet-on-Wet" Casting Procedure

Two mixtures are prepared so they can be cast sequentially, into a mold, one on top of the other. Mixture (A) consists of a filler, such as alumina trihydrate, dispersed in a liquid phase consisting of a syrup containing approximately 20% polymethylmethacrylate in methyl methacrylate monomer along with an initiator. Additional monomer may be added to adjust the mix viscosity. Colored pigments and/or particles may be added to get a desired color and pattern. A typical composition for mixture (A) comprises:

|  | Wt % |
| --- | --- |
| Methyl methacrylate | 4.0 |
| Syrup | 36.0 |
| Alumina trihydrate | 42.0 |
| Colored particles (30–150 mesh, US Standard Sieve = 100–600 µm) | 18.0 |
|  | 100.0 |

Mixture (B) consists of a filler, usually lightweight, such as hollow glass microspheres along with calcium carbonate, dispersed in a liquid phase consisting of a syrup containing approximately 20% polymethylmethacrylate in methyl methacrylate monomer and an initiator. Additional monomer may be added to adjust casting viscosity. A typical composition for mixture (B) comprises:

|  | Wt % |
| --- | --- |
| Methyl methacrylate | 44.0 |
| Syrup | 11.0 |
| Alumina trihydrate | 37.0 |
| "Scotchlite" K-1 glass bubbles (20–120 µm, median 70 µm, sp.gr. 0.125) | 8.0 |
|  | 100.0 |

Mixture (A) is evacuated to remove air, then poured into a mold to form a 0.5 cm layer in the bottom of the mold. Mixture (B), also evacuated, is then poured on top of the layer from mixture (A) in the mold while it is still wet and uncured, to form a second layer which is 1.4 cm thick. After the structure has cured, the polymerized form of mixture (A) is the face layer and that of mixture (B) is the back foam layer. Although there appears to be two separate layers there is no interface between them. They are integral, with the polymer matrix continuous throughout the structure.

I claim:

1. A cast composite article comprising a polymer matrix, having a first zone and a second zone, the article being substantially flat with a first face and an opposing second face, the first zone including the first face of the article and filler at a level in the range of 10 to 80% by weight of the filler plus matrix, the second zone including the opposing second face of the article and filler at a level in the range of 5 to 60% and bubbles at a level in the range of 3 to 30% with both filler and bubbles present by weight of the total of filler, plus bubbles, plus matrix; wherein the first and second zones form a continuum with essentially no laminar transition of unfilled matrix between the zones; wherein the first zone does not contain bubbles; wherein the filler in the first zone is selected from alumina trihydrate, alumina, silica, calcium carbonate, ground particles of filled or unfilled resins, glass, and natural stone materials; wherein the filler in the second zone is selected from alumina trihydrate, alumina, silica, calcium carbonate, ground particles of filled or unfilled resins, glass, and natural stone materials; and wherein the bubbles are selected from glass and polymeric microspheres, fly ash, and perlite.

2. The cast article of claim 1 in which said polymer matrix is prepared from at least one monomer selected from the group consisting of: acrylic acid, methacrylic acid, alkyl acrylates and methacrylates having 1–18 carbon atoms in the alkyl group, styrene, substituted styrenes, vinyl acetate, acrylonitrile, methacrylonitrile, maleic anhydride, esters of maleic acid, itaconic acid and esters of itaconic acid, with or without a crosslinking dimer, trimer, or tetramer.

3. The cast article of claim 1 having an additional layer of hard facing on said first face, such hard facing comprising a polymer matrix and filler harder than alumina trihydrate selected from the group consisting of alumina, silica, calcium carbonate and natural stone materials.

4. The cast article of claim 1 in which in the first zone the filler comprises about 45 to 65% alumina trihydrate by weight of the first zone having an average particle size in the range of about 30 to 70 microns, and in the second zone the filler comprises about 30 to 60% calcium carbonate by weight of the second zone having an average particle size in the range of about 3 to 14 microns, and 5 to 15% glass bubbles by weight of the second zone having an average particle size in the range of about 30 to 100 microns.

5. The cast article of claim 4 in which a third zone similar in composition to the first zone is adjacent to the second face of the cast article said first, second and third zones forming a continuum with essentially no layer of unfilled matrix between the zones.

6. The cast article of claim 1 in which the filler in the first zone comprises about 10 to 50% alumina trihydrate by weight of the first zone having an average particle size in the range of 3 to 100 microns and 5 to 70% ground particles of filled or unfilled resin by weight of the first zone having an average particle size in the range of 50 microns to 20 millimeters.

* * * * *